United States Patent Office.

HENRY HARROP, OF HOBOKEN, NEW JERSEY.

*Letters Patent No.* 46,354, *dated February* 14, 1865; *reissue No.* 3,903, *dated April* 5, 1870.

MODE OF ORNAMENTING.

The Schedule referred to in these Letters Patent and making part of the same

*To all whom it may concern:*

Be it known that I, HENRY HARROP, now of Hoboken, Hudson county, New Jersey, have invented an Improvement in Ornamenting or Decorating; and the following is declared to be a correct description of the same.

My invention relates to the mode of ornamenting articles of manufacture by transferring a printed impression to the article from thin or tissue paper, prepared and manipulated substantially as hereinafter specified.

The design, ornamentation, or decoration, is to be drawn upon a lithographic stone, in the manner usual in lithography, and the printing is done in the ordinary way, but the ink or size employed is to be adapted to the intended use. I prefer to use a compound of copal varnish, litho-varnish and linseed oil mixed well together, in the proportions desired to produce the required effect.

The paper upon which an impression is to be taken is previously prepared by a coating of paste spread evenly upon its surface, and allowed to dry, or nearly so; I prefer wheat-flour paste.

After the impression has been taken upon the surface, coated as aforesaid, I further prepare the same for use in ornamenting or decorating by placing upon the paper gold or silver-leaf, bronze, or any metal leaf, and remove such portions thereof as do not adhere to the design.

The article to be ornamented is prepared by a coating of sizing spread upon its surface. Said sizing is to be of any known or desired character; I prefer that known as japanner's size.

The thin or tissue paper is placed upon the article with the impressed surface upon said sizing, and by a slight pressure the paper is caused to adhere evenly, after which the paper is moistened with water, so as to soften the coating of paste, and then the paper can be pulled off, leaving the decoration upon the article.

When the ornamentation is to have the burnished appearance known as burnished gilding, the gold-leaf is applied directly to the surface of the plate of glass or other article to which it is caused to adhere by isinglass sizing. The paste-coated paper is to be printed upon with the desired design or ornamentation, but instead of metal leaf or bronze applied thereto, I sprinkle over the impression finely-powdered resin.

The resin that adheres to the design gives to the same a sufficient body, and I moisten the same sufficiently by exposing the impression to the fumes or vapor from spirits of turpentine. To effect this a sheet of thick paper may be laid in a box and saturated with spirits of turpentine, and the impressed tissue paper be supported above the same upon a suitable rack.

When the resinous coating of the impression has become sufficiently effected by the turpentine vapors, the impressed surface of the paper is applied to the gilded surface of the article aforesaid, and, by carefully rubbing the said paper, the resinous material of the design is transferred to the gilded surface of the article, and when dry forms a protection to the portions forming the design, and the other portions of the gold-leaf are moistened and wiped off, leaving the design in the burnished gilding. The paper should be slightly dampened to facilitate the transfer of the printed design from the surface of the paper to the gilded surface.

I claim as my invention the ornamenting of articles with metallic leaf or bronze, by transfer of a printed design from thin paper prepared as set forth.

Dated this 4th day of February, A. D. 1870.

H. HARROP.

Witnesses:

CHAS. H. SMITH,

GEO. T. PINCKNEY.